(12) United States Patent
Tripathy et al.

(10) Patent No.: US 7,191,318 B2
(45) Date of Patent: Mar. 13, 2007

(54) NATIVE COPY INSTRUCTION FOR FILE-ACCESS PROCESSOR WITH COPY-RULE-BASED VALIDATION

(75) Inventors: Tarun Kumar Tripathy, Fremont, CA (US); Millind Mittal, Palo Alto, CA (US); Kaushik L. Popat, Pleasanton, CA (US); Amod Bodas, Cupertino, CA (US)

(73) Assignee: Alacritech, Inc., San Jose, CA (US)

( * ) Notice: Subject to any disclaimer, the term of this patent is extended or adjusted under 35 U.S.C. 154(b) by 355 days.

(21) Appl. No.: 10/249,416

(22) Filed: Apr. 7, 2003

(65) Prior Publication Data

US 2004/0117602 A1 Jun. 17, 2004

Related U.S. Application Data

(63) Continuation-in-part of application No. 10/248,029, filed on Dec. 12, 2002.

(51) Int. Cl.
*G06F 9/00* (2006.01)
(52) U.S. Cl. ............................ 712/225; 710/22; 710/24
(58) Field of Classification Search ................ 710/23
See application file for complete search history.

(56) References Cited

U.S. PATENT DOCUMENTS

| | | | |
|---|---|---|---|
| 3,717,851 A | 2/1973 | Cocke et al. ............... | 711/220 |
| 4,520,439 A | 5/1985 | Liepa ......................... | 711/201 |
| 4,598,359 A | 7/1986 | Boothroyd et al. ......... | 711/214 |
| 5,187,796 A | 2/1993 | Wang et al. .................... | 712/4 |
| 5,222,225 A | 6/1993 | Groves ........................ | 710/22 |
| 5,282,201 A | 1/1994 | Frank et al. ................. | 370/403 |
| 5,495,592 A | 2/1996 | James et al. ................ | 711/212 |
| 5,761,521 A | 6/1998 | Chilinski et al. .............. | 712/1 |
| 5,931,940 A | 8/1999 | Shelton et al. .............. | 712/204 |
| 6,052,693 A | 4/2000 | Smith et al. ............. | 707/104.1 |
| 6,321,310 B1* | 11/2001 | McCarthy et al. .......... | 711/154 |
| 6,330,623 B1 | 12/2001 | Wu et al. ...................... | 710/23 |

(Continued)

OTHER PUBLICATIONS

Weaver et al. "The SPARC Architecture Manual" Version 9, pp. 194-197, 2000.*

*Primary Examiner*—Eddie Chan
*Assistant Examiner*—Jacob Petranek
(74) *Attorney, Agent, or Firm*—Mark Lauer; Silicon Edge Law Group LLP; Stuart Auvinen

(57) ABSTRACT

A copy instruction executed by a functional-level instruction-set computing (FLIC) processor copies a variable-length data block from one resource to another resource through a cross-bar switch. Resources include general-purpose registers, input, output, and execution buffers, DRAM, SRAM, and other memory. A copy-with-validate instruction has an operand pointing to a first rule in an immediate rule table. The first rule controls validation of a first data-item in the data being copied. Validation includes range and equality checking of the data-item. The value of the data-item or the current offset can be written to a register. A format field in the rule indicates the size of the data-item, or the size is read from the data-item for variable-size formats. The current offset is incremented by the size. The next data-item is validated by a next rule, and other rules in the immediate table control validation of other data-items in the data block.

21 Claims, 10 Drawing Sheets

U.S. PATENT DOCUMENTS

| | | | |
|---|---|---|---|
| 6,349,379 B2 * | 2/2002 | Gibson et al. | 712/210 |
| 6,389,527 B1 | 5/2002 | Raam et al. | 712/38 |
| 6,408,433 B1 * | 6/2002 | Click et al. | 717/154 |
| 6,453,365 B1 | 9/2002 | Habot | 710/22 |
| 6,457,073 B2 | 9/2002 | Barry et al. | 710/22 |
| 6,622,214 B1 * | 9/2003 | Vogt et al. | 711/141 |
| 6,636,950 B1 * | 10/2003 | Mithal et al. | 711/147 |
| 6,915,372 B2 * | 7/2005 | Magill et al. | 710/317 |
| 6,944,683 B2 * | 9/2005 | Barry et al. | 710/22 |

* cited by examiner

NATIVE COPY INSTRUCTION FOR FILE-ACCESS PROCESSOR WITH COPY-RULE-BASED VALIDATION

CROSS REFERENCE TO RELATED APPLICATIONS

This application is a continuation-in-part of the co-pending application for Functional-Level Instruction-Set Computer Architecture for Processing Application-Layer Content-Service Requests Such as File-Access Requests, U.S. Ser. No. 10/248,029, filed Dec. 12, 2002.

FIELD OF THE INVENTION

This invention relates to computer architecture, and more particularly to copy instructions and data validation.

BACKGROUND OF THE INVENTION

Complex computing tasks such as processing file-access requests often require execution of hundreds of complex instruction set computer (CISC) instructions or even more reduced instruction set computer (RISC) instructions. File-access requests may be received from a variety of source over a network such as the Internet, and these requests may be in a variety of formats for the many different protocols in use. These requests may be contained in messages that include a header than must be parsed to locate critical information, such as a file name or handle for the requested resource.

The parsing of the header is made more difficult by the use of variable-length strings. The file handle may include a file name, which may be stored as a variable length string. Locating fields in the header after such a variable-length field requires knowledge of the string length, which may not be known until after the variable-length string field is read.

The parent application disclosed a new type of computer architecture ideally suited for processing such file-access requests. Rather than executing lower-level CISC or RISC instructions, the new architecture executes function-level instructions. This architecture that executes these functional-level instructions is called Functional-level instruction-set computing (FLIC).

The present application is directed to FLIC copy instructions. The functional-level copy instruction can copy variable-length data between a variety of computing resources on a FLIC processor, such as between general-purpose registers (GPR's), dynamic-random-access memory (DRAM), static random-access memory (SRAM), variable-length execution buffers, input and output buffers, and immediate tables.

FIG. 1 is a diagram of a FLIC processor. FLIC processing engines 20 include one or more slices of FLIC engine 60. Each slice can process a different request, allowing for parallel processing of requests from different sources.

Copy/move unit 58 moves data among computing resources, such as from input buffer 42 to FLIC engine 60 and then to output buffer 44. Copy/move unit 58 also allows FLIC engine 60 to read and write memory resources such as global block 40. Global block 40 can include DRAM 45, SRAM 43, and immediate table 48.

SRAM 43 can include state memory referred to by a state identifier copied from state input buffer 41 into execution buffers 54.

Requests from I/O, network interfaces, general-purpose processing engines, and/or co-processors are received into input buffer 42. These requests may include messages that have variable-length strings and require parsing, such as file-access commands. Copy/move unit 58 copies parts of requests stored in input buffer 42 to FLIC engine 60, and writes replies to output buffer 44. The replies in output buffer 44 can be sent to I/O ports, general-purpose processing engines and/or co-processors.

FLIC engine 60 includes a variety of specialized execution hardware, such as processing units 50. A vector compare unit in processing units 50 can compare variable-length strings, assisting in parsing a request message. Processing units 50 can also include an arithmetic-logic-unit (ALU), branch, bitmap processing units, security-acceleration units, and a variety of other kinds of units.

Immediate table 48 contains pre-defined constants, structure templates, and rule values that can be used by instructions. During execution, an immediate value can be copied from immediate table 48 to processing units 50 or to registers 46, or to execution buffers 54.

Data operands can be stored in fixed-length registers 46, which are architecturally-visible general-purpose registers. Variable-length operands can be stored in execution buffers 54. A register in fixed-length registers 46 can contain a pointer to the location of the variable-length operand in execution buffers 54. Another register in fixed-length registers 46 can store the length of the variable-length operand or contain a pointer to the end of the variable-length operand in execution buffers 54.

Multiple contexts can be supported. Multiple sets of fixed-length registers 46 and execution buffers 54 can be provided, with a different register set assigned to each context. Input buffer 42 can likewise support multiple contexts with separate storage areas for each context. Rapid context-switching can be supported by switching the current input buffer, register, and execution-buffer set being used for execution.

Expansion buffer 52 provides additional storage space for execution buffers 54. When additional storage space is needed by a context to store variable-length operands, additional space can be allocated to that context's execution buffers 54 from expansion buffer 52.

A context is allocated to process a request message. One set of fixed-length registers 46 and execution buffers 54 is allocated for processing a message. A context may refer to a relevant state using a state ID. A context's current state ID can be stored in each context's execution buffer 54. The state ID is a pointer to more detailed state information contained in a state memory such as in SRAM 43 of global block 40. State parameters such as a current state in a sequence of states can be copied from state memory in SRAM 43 to fixed-length registers 46 or execution buffers 54 when needed for execution. Both global and local state ID's can be supported.

Instruction fetch, decode, and dispatch units (not shown) can exist on each slice of FLIC engine 60, or can be shared among all slices.

What is desired is a functional-level copy instruction that can copy variable-length data. A FLIC copy instruction that can copy data among a variety of resources, such as registers, input, output, and execution buffers, and global block SRAM or DRAM memories, is desirable. An extension of the copy instruction for performing validation of the data being copied is also desired.

SUMMARY

In one embodiment, a processor is disclosed comprising: an instruction decoder for decoding instructions in a program being executed by the processor, the instructions including a copy instruction; a plurality of memory resources for storing data, including a register file containing registers that store operands operated upon by the instructions, the registers being identified by operand fields in the instructions decoded by the instruction decoder; a copy unit, activated by the instruction decoder when the copy instruction is decoded, for performing a copy operation indicated by the copy instruction, the copy operation reading a data block from a source resource in the plurality of memory resources, the source resource specified by the copy instruction, the copy operation writing the data block to a destination resource in the plurality of memory resources, the destination resource specified by the copy instruction, the copy operation parsing the data block to create a series of pointers that correspond to a series of data-items within the data block, wherein at least one of the data-items includes a file name or file handle.

DETAILED DESCRIPTION

The present invention relates to an improvement in copy-with-validate instructions. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figures 2, 3:
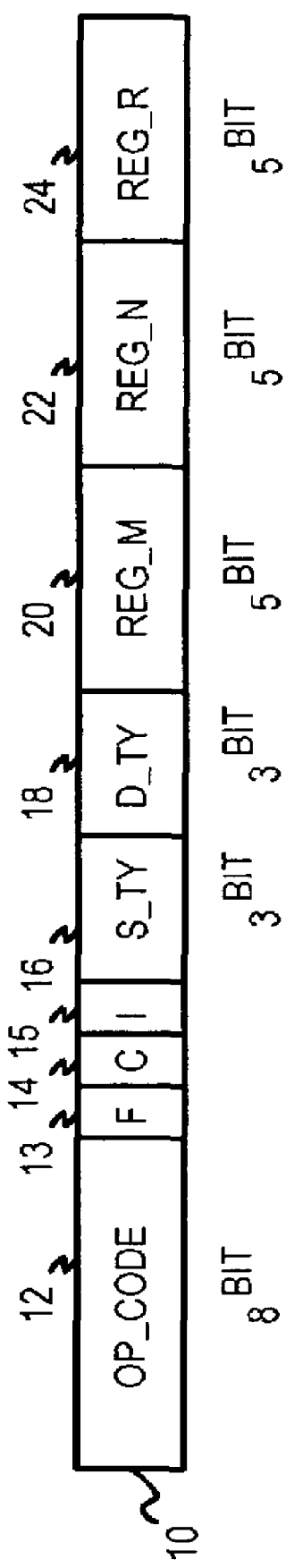
FIG. 2 shows a basic copy instruction.
FIG. 3 is a table of resource types for the copy instruction.

FIG. 2 shows a basic copy instruction. Copy instruction 10 has a width of 32 bits (four bytes) and can be decoded by an instruction decoder for a FLIC processor. Execution of copy instruction 10 is native, since copy instruction 10 is not re-compiled or translated into many machine-level instructions; copy instruction 10 is a machine-level instruction.

Copy instruction 10 contains opcode 12, which is a multi-bit binary number that indicates the type of operation performed by instruction 10. Other native instructions have other binary numbers in the opcode field. Opcode 12 is decoded by the processor's instruction decoder to determine what operation to perform, and perhaps to select a sequence of cycles and control signals in a hardware or firmware sequencer.

Opcode 12 is an 8-bit code in this example, allowing for as many as 256 different instruction types to be decoded, such as branches, compares, moves, read/write, input/output, adds, multiplies, divides, etc. The opcode for the basic copy is "C0" in hexadecimal in this example. Another opcode, "C1" is used for the copy-with-validate instruction described later in FIG. 8.

Several control bits in instruction 10 control execution of the copy instruction. Fence (F) bit 13 is set to force the next instruction to wait until the execution of the current copy instruction completes. Otherwise when F=0, the next instruction can be executed by the pipeline in an overlapped fashion. Fence bit 13 is useful for imposing stricter instruction ordering during code execution.

Condition (C) bit 14 is set to 1 to use a condition-code register. When C=1, a condition-code register is read before the copy instruction executes. If the condition-code register contains all zeros, the copy instruction is executed. If any one bits are present in the condition-code register, then execution of the current copy instruction is aborted. The condition-code register can be used as a status or error register, being written with non-zero error codes when a prior instruction fails.

Immediate (I) bit 15 is set to one to read the copy length from the immediate table. Fixed-length copies for some common lengths can use pre-defined copy-length parameters from the immediate table. When I=0, the copy length is read from a register pointed to by operand field 22.

Operands are specified by operand fields 20, 22, 24. Operand fields 20, 22, 24 are each 5-bit fields, each selecting one register from among 32 registers in the processor's GPR's. The copy instruction copies a block of data from a source address specified by a source operand to a destination address specified by a destination operand. The length of the data block copied is specified by the length operand.

The source operand is stored in register M, pointed to by source operand field 20. The destination operand is stored in register R, pointed to by destination operand field 24. The copy length is stored in register N, pointed to by length operand field 22.

The user or programmer can perform a copy by including a copy instruction in the assembly or machine code. The programmer or the code complied by a compiler program specifies the copy instruction's opcode and condition bits, and the resource type and address for both the source and destination. The register codes are appended to generate the 32-bit instruction. The FLIC processor decodes this 32-bit instruction and has the execution pipeline execute the copy instruction, routing data from the source to the destination specified by the registers.

Since the copy instruction can copy between a variety of resources on the FLIC processor, the source and destination resources are specified in source type (S_TY) field 16 and destination type (D_TY) field 18. Fields 16, 18 are each 3 bits, allowing selecting from up to 8 resource types.

FIG. 3 is a table of resource types for the copy instruction. Type fields 16, 18 in copy instruction 10 of FIG. 2 each contain a 3-bit resource type code. The type codes are shown in the table of FIG. 3. Type code 0 specifies that the source is the input buffer. The input buffer has a size of 2K bytes in this example. Type code 1 specifies that the source is the state input buffer. The state input buffer has a size of 256 bytes.

Type code 2 specifies that the source or destination is the DRAM, which has a size of 2 Giga-bytes. The execution buffer is specified by type code 3, while the SRAM in the global block is specified by type code 4. The fixed-length registers or GPR's are specified by type code 5, while the output buffer is specified by type code 6. Type code 7 is undefined, but could be used for another resource.

Figure 1:
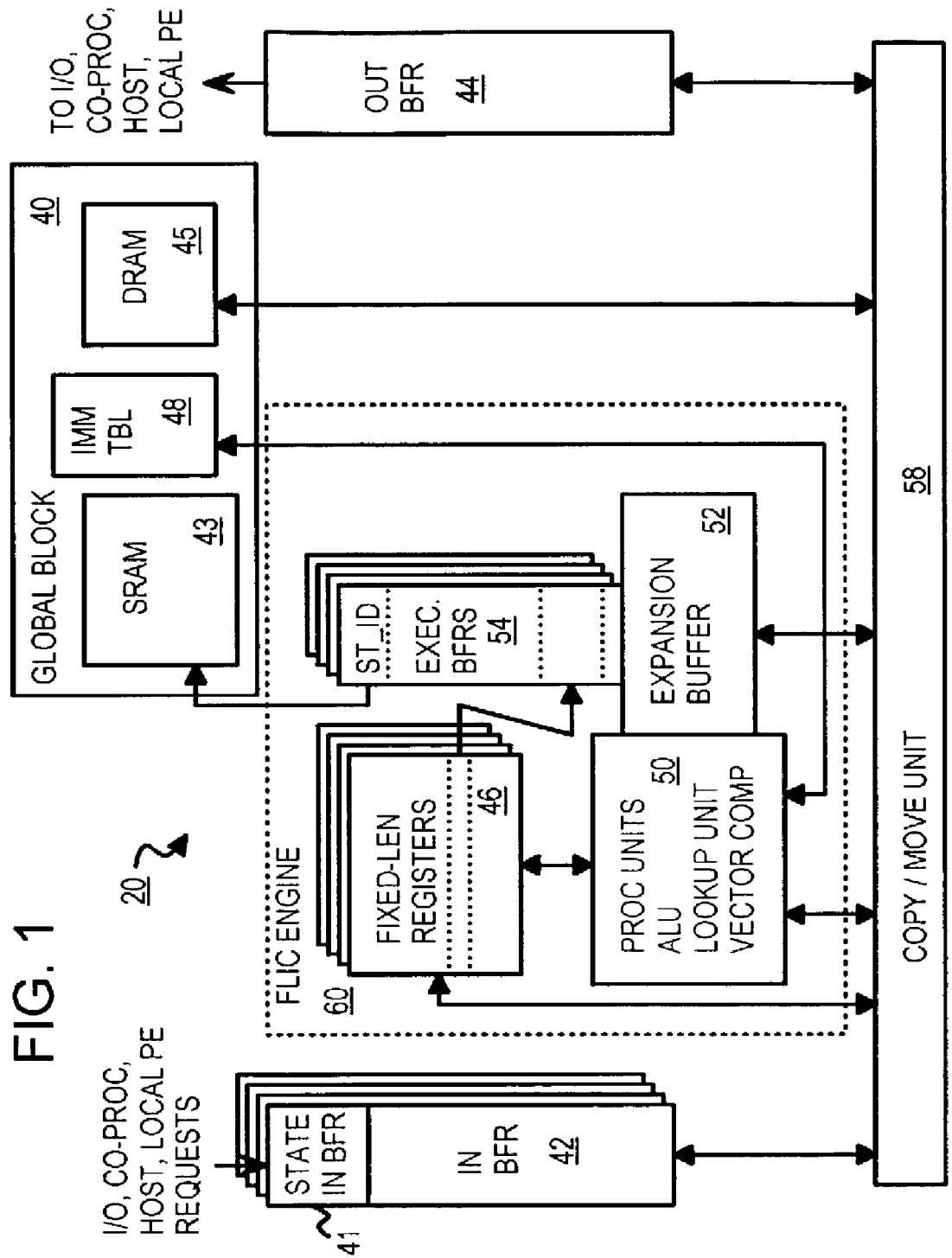
FIG. 1 is a diagram of a functional-level instruction-set computing (FLIC) processor.

The addresses pointed to by the source and destination operands refer to addresses within each resource type. The source and destination could have the same address, but in different resources with different resource codes. The maximum address size varies for each resource type, from 2 Giga-byte for the DRAM, down to 256 for the state input buffer. The execution buffer can be extended from 2K to a larger size by using expansion buffer 52 of FIG. 1. The size of the global block can be programmable. The DRAM in the global block can be accessed either using DRAM type code 2 or global block type code 4.

Figure 4:
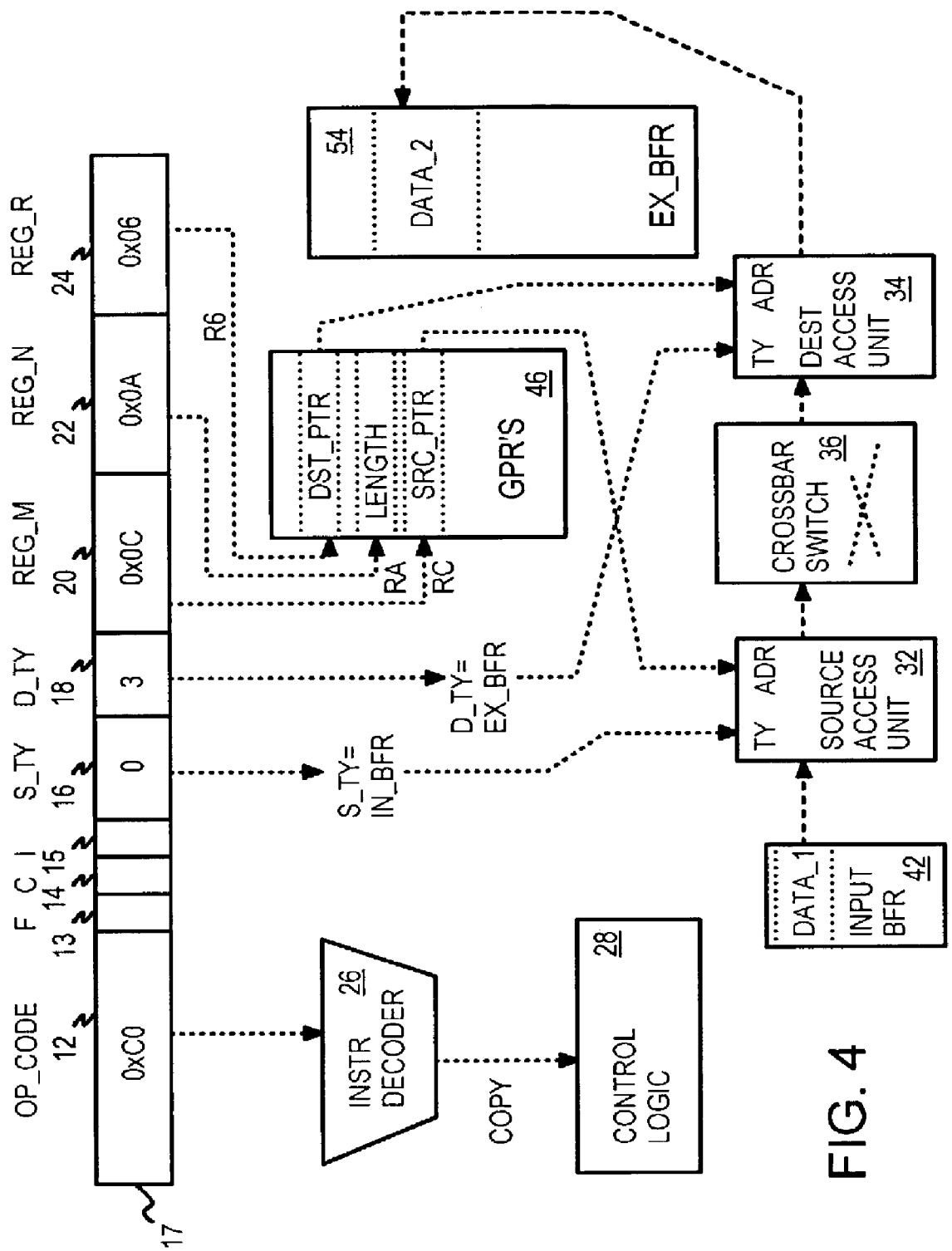
FIG. 4 is an overview of execution of a native copy instruction.

FIG. 4 is an overview of execution of a native copy instruction. Program code is complied into native instructions, which are loaded into memory and fetched into an instruction buffer. As instructions are executed and removed from the instruction buffer, eventually the copy instruction is ready for execution and is available in instruction register 17 or otherwise in a next-instruction location in the instruction buffer.

Instruction decoder 26 reads opcode 12 from instruction register 17 and decodes the opcode to determine what operation is called for by the instruction in instruction register 17. In this example, opcode 12 is 0×C0 (hex), which is the opcode for the copy instruction. Instruction decoder 26 selects a sequence of control signals and cycles for control logic 28 that causes the processor execution pipeline to perform the copy operation. Control bits 13, 14, 15 are also examined and may alter or halt the copy operation.

The resource types are read from type fields 16, 18. The source type S_TY is 0, specifying input buffer 42 as the source containing the data block to be copied. The destination type D_TY is 3, specifying execution buffers 54 as the destination the data block is to be copied to. Data block DATA_1 is to be copied from input buffer 42 to execution buffers 54. The copied data is DATA_2.

Operand fields 20, 22, 24 specify which GPR registers in fixed-length registers 46 are the M, N, and R registers. In this example, source register M is register C (RC) while length register N is register A (RA) and destination register R is register 6 (R6). Register M (RC) contains a source pointer SRC_PTR to a location in input buffer 42 where the data block to be copied DATA_1 is located. Register N (RA) contains the length of the data block in bytes. Register R (R6) contains a destination pointer DST_PTR to a location in execution buffers 54 where the data block is copied to as copied data DATA_2.

The source type S_TY from field 16 and the source pointer SRC_PTR from fixed-length registers 46 are sent to source access unit 32. The copy length is also applied to source access unit 32 and destination access unit 34. Source access unit 32 reads DATA_1 from input buffer 42 at the address specified by the source pointer SRC_PTR. The data copied is routed through crossbar switch 36 to destination access unit 34.

Destination access unit 34 receives destination type D_TY from field 18 and the destination pointer DST_PTR from fixed-length registers 46. The copy data from crossbar switch 36 is written to a location in execution buffers 54 specified by the destination pointer. The copy of DATA_1 in execution buffers 54 is DATA_2.

Figure 5:
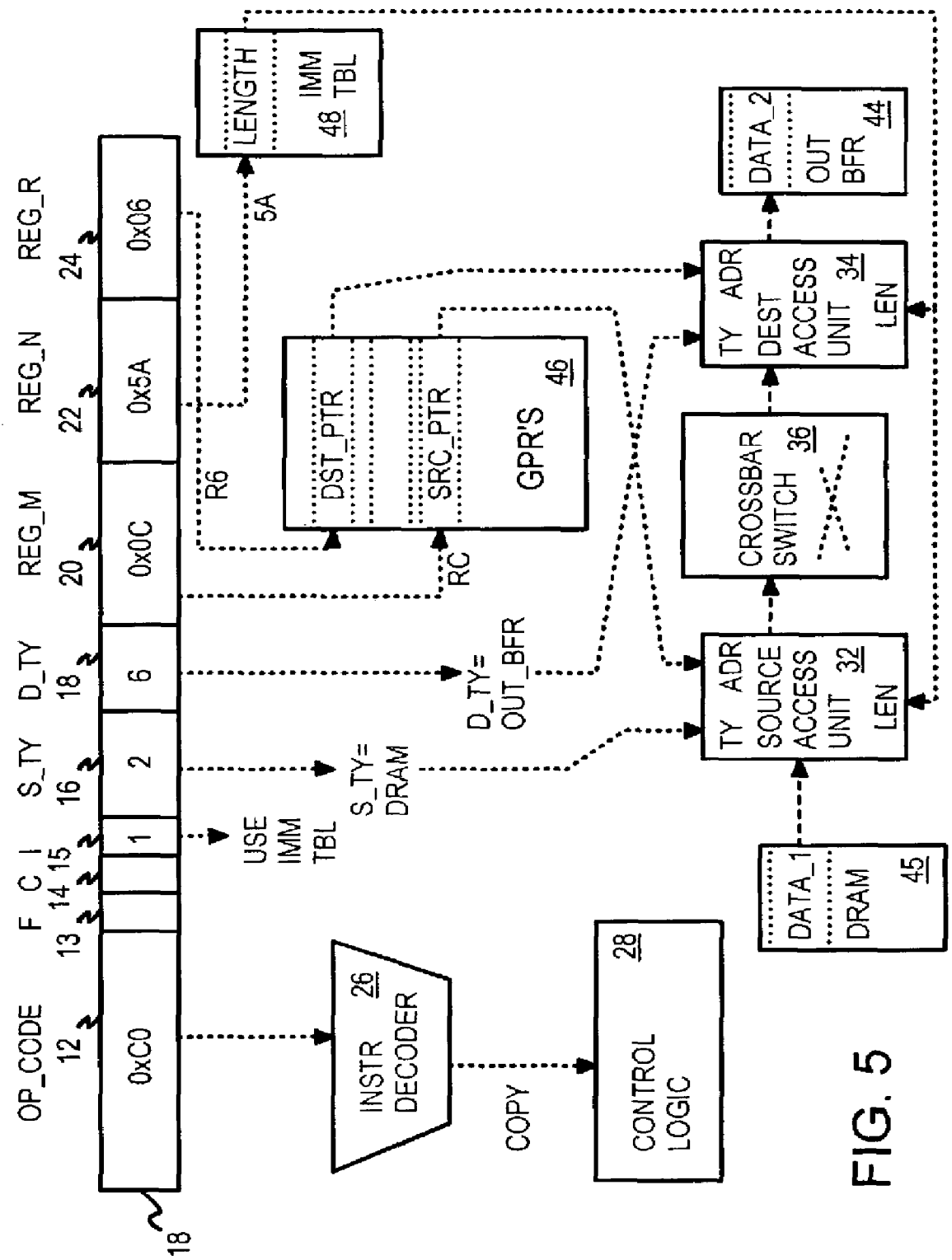
FIG. 5 shows of execution of a copy instruction using an immediate table.

FIG. 5 shows of execution of a copy instruction using an immediate table. Execution of the copy instruction in instruction register 17 is similar to that described for FIG. 5. However, Immediate (I) bit 15 is set to one in this example. Setting the immediate bit causes the copy length to be read from immediate table 48 rather than from fixed-length registers 46.

The copy is between different resources in this example. The source type S_TY is 2, specifying DRAM 45 as the source containing the data block to be copied. The destination type D_TY is 6, specifying output buffer 44 as the destination the data block is to be copied to. Data block DATA_1 is to be copied from DRAM 45 to output buffer 44.

Operand fields 20, 24 specify which GPR registers in fixed-length registers 46 are the M and R registers. In this example, source register M is register C (RC) destination register R is register 6 (R6). Register M (RC) contains source pointer SRC_PTR to a location in DRAM 45 where the data block to be copied DATA_1 is located. Register R (R6) contains destination pointer DST_PTR to a location in output buffer 44 where the data block is copied to as copied data DATA_2.

Operand field 22 specifies an offset within immediate table 48 that contains the copy length. In this example, operand field 22 contains the value "5A", specifying offset address 5A in immediate table 48. The copy length from immediate table 48 is sent to source access unit 32 and destination access unit 34 to indicate the length of data to copy.

The source type S_TY from field 16 and the source pointer SRC_PTR from fixed-length registers 46 are sent to source access unit 32. Source access unit 32 reads DATA_1 from DRAM 45 at the address specified by the source pointer SRC_PTR. The data copied is routed through crossbar switch 36 to destination access unit 34.

Destination access unit 34 receives destination type D_TY from field 18 and the destination pointer DST_PTR from fixed-length registers 46. The copy data from crossbar switch 36 is written to a location in output buffer 44 specified by the destination pointer. The copy of DATA_1 in output buffer 44 is DATA_2.

Figure 6:
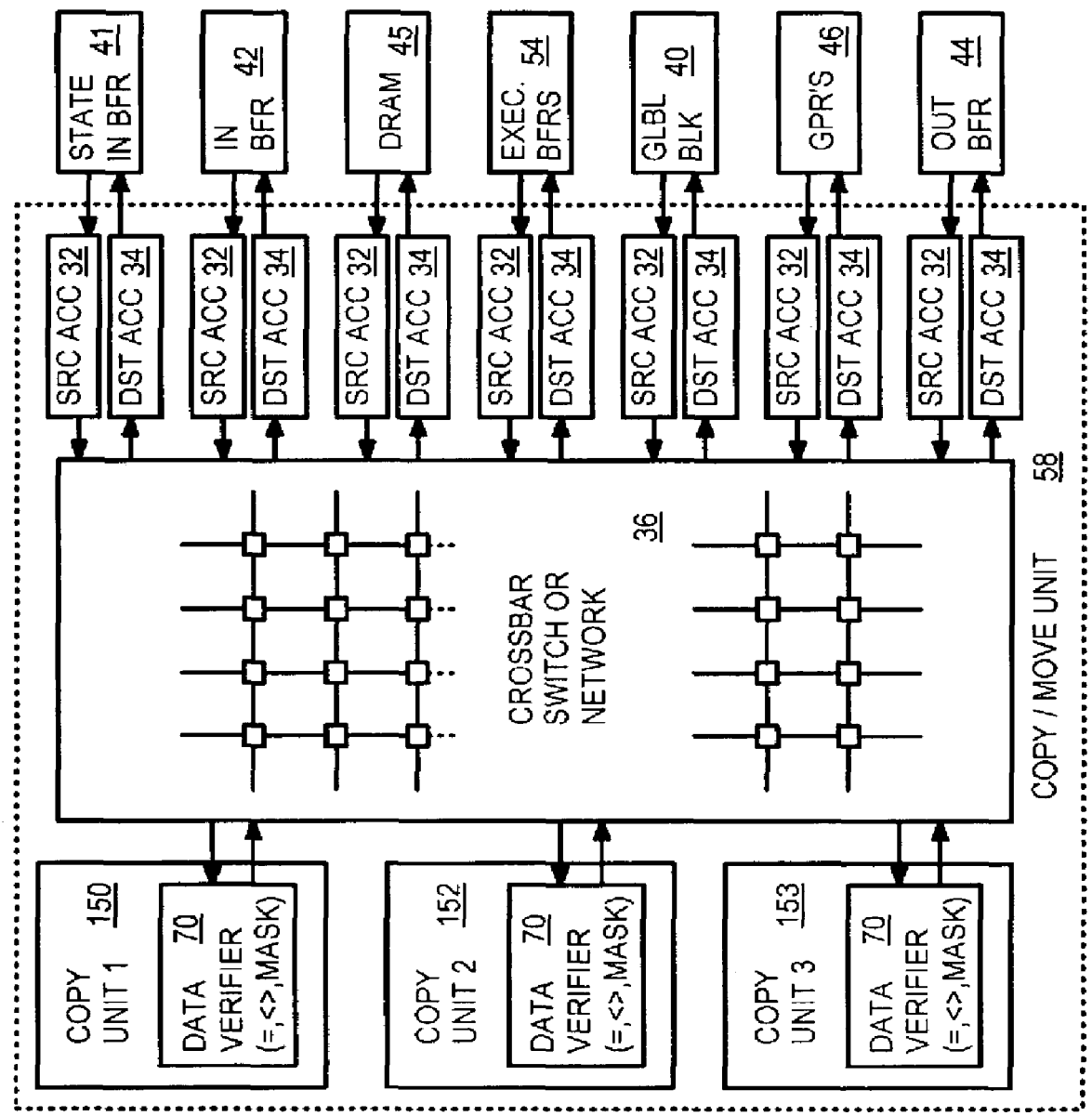
FIG. 6 shows more detail of an embodiment of the copy/move unit.

FIG. 6 shows more detail of an embodiment of the copy/move unit. Copy/move unit 58 copies data between resources that include state input buffer 41, input buffer 42, DRAM 45, execution buffers 54, global block 40, fixed-length registers 46, and output buffer 44.

In this embodiment each resource is connected to a source access unit 32 and a destination access unit 34 dedicated to that one resource. Other embodiments may have several resources sharing a pair of source access unit 32 and destination access unit 34.

Copy/move unit 58 uses crossbar switch 36 to route the copied data from a source access unit 32 to a destination access unit 34. For a basic copy, data can be routed directly from a source access unit 32 for one resource to a destination access unit 34 for another resource. The particular source access unit 32 is selected by the source type S_TY while the particular destination access unit 34 is selected by the destination type D_TY read from the copy instruction. Thus the type field in the copy instruction selects which source access unit 32 and destination access unit 34 to activate and receive the source or destination pointer and the copy length.

More complex copy-with-validate instructions require the use of validation hardware. When the more complex copy-with-validate instruction is executed, one of parallel copy units 150, 152, 153 is assigned to process the copy instruction. Each copy unit 150, 152, 153 contains an instance of data verifier 70. Data verifier 70 performs specialized copy-validation operations that are specified by the copy-with-validate instruction. For example, data verifier 70 can compare the data being copied to a range or a pre-determined value, and can mask the data before verification. Data verifier 70 performs the more complex verification tasks defined by the copy-rules described for execution of the copy-with-validate instruction in FIGS. 7–9.

For the copy-with-validate instruction, data is read from the source resource by one of source access unit 32, routed through crossbar switch 36 to copy unit 150 (or copy unit 152, 153). Data verifier 70 in copy unit 150 operates on the data being copied, verifying that it meets the requirements of various copy-rules and perhaps altering the copied data. The copied data verified by data verifier 70 is then routed back through crossbar switch 36 to destination access unit 34 for the destination resource.

Figure 7:
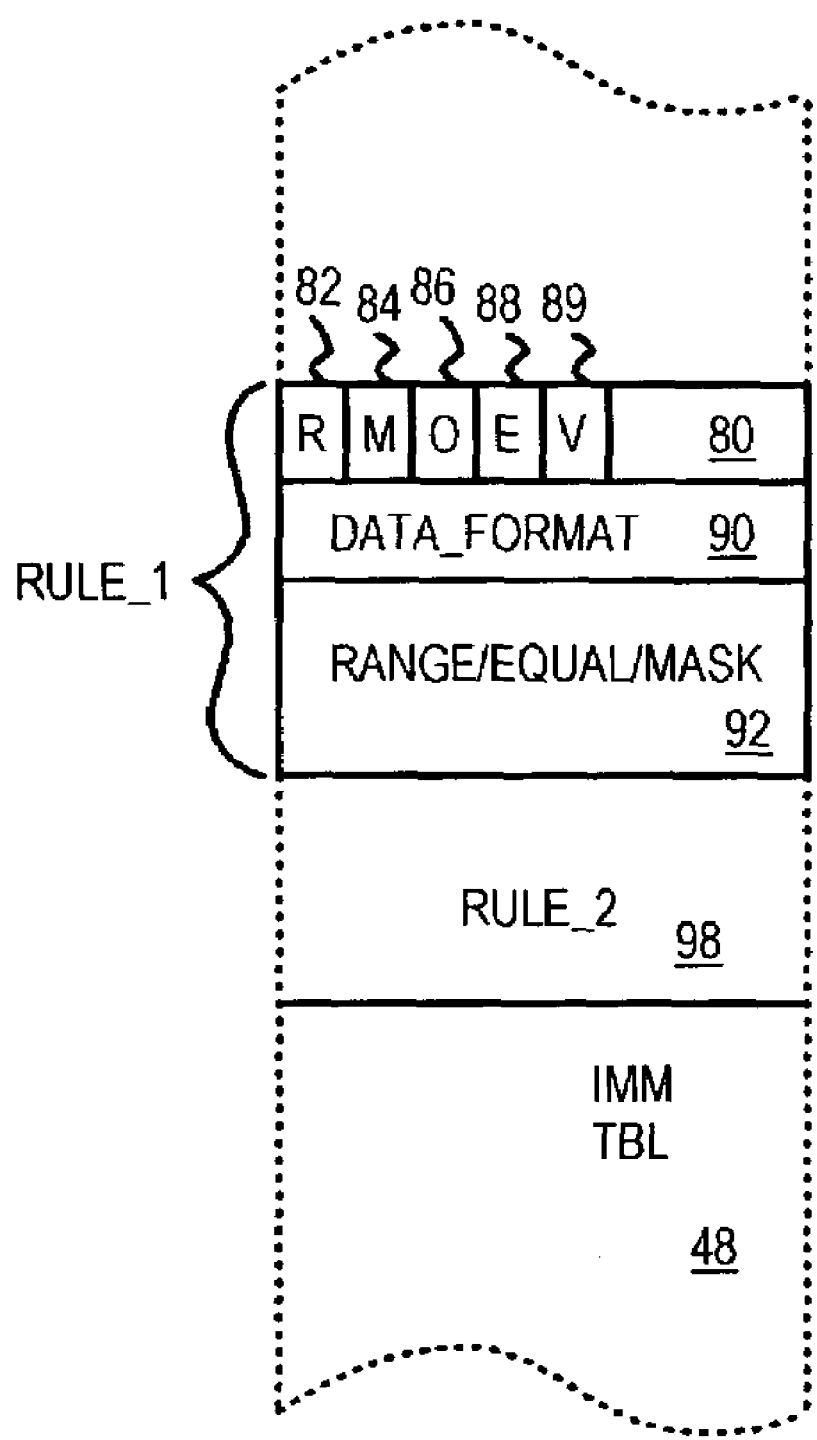
FIG. 7 shows a copy-rule in the immediate table.

Copy-Rules—FIG. 7

FIG. 7 shows a copy-rule in the immediate table. Rather than specify a large number of operands, the copy-with-validate instruction points to copy-rules in the immediate table. The copy-rules specify the specific validation tasks to be performed on the data being copied. A large number of rules can be specified, such as up to 32 rules per copy-with-validate instruction.

The second operand field in the copy-with-validate instruction contains an offset to the first copy-rule in immediate table 48. Each copy-rule is six bytes in this example, but could be extended to 8 bytes or some other number of bytes. The first byte of each copy-rule contains control bits 80, while the second byte contains data-format field 90. The third through sixth bytes, value field 92, contain a range, equal, or mask value. Second rule 98 immediately follows the end of the first rule in immediate table 48. Second rule 98 and other copy-rules each start with a control byte 80, and have a data-format field 90 and a value field 92.

Parsing Series of Data Items Corresponds to Series of Copy-Rules

The source data can be considered to contain a series of data items. Each copy-rule can validate one of the data items in the source data. Successive copy-rules validate successive data items in the source data. For example, each data item can be a different field in a header when the source data is a header. A header containing 7 fields could be verified by one copy-with-validate instruction that points to the first of 7 copy-rules in immediate table 48. Each successive copy-rule in immediate table 48 validates the next successive field in the header or source data.

The length of each data item is determined by data-format field 90. A wide variety of data-formats can be supported, such as a 4-byte unsigned integer, an 8-byte double integer, a 4-byte Boolean parameter, an array of 4-byte elements, or a variable-length string or opaque data. Variable-length data items may have their lengths as the first 4 bytes of the data item.

Data-format field 90 thus indirectly specifies the expected length of each data item in the source data. Parsing of a series of data items in a data block of source data can be performed by executing just one copy-with-validate instruction that points to a series of copy-rules, one copy-rule for each data item in the series.

Validation Operations in a Copy-Rule

Control byte 80 specifies the verification operations performed by the copy-rule. When range (R) bit 82 is set, a source value is read from current data-item of the source data being copied. This source value is compared to a range value that is stored in value field 92 of the current rule. A failure occurs when the source value is greater than the range value. When the source field (data-item) is a variable-length field, just the first four source bytes can be compared. This is useful since the first four bytes are often used to store a string-length.

When mask (M) bit 84 is set, a mask is read from value field 92 in the current rule. The mask is applied to the source data. When a bit of the mask value in value field 92 is set, the corresponding bit in the source data being copied is examined. Other codings of mask bits can also be used. The mask bits can be ANDed with the source data bits, and then a failure signaled if the result is non-zero for any bit positions.

When offset (O) bit 86 is set, the current offset from the beginning of the source data is written to an output register. When several copy-rules have already been processed, the O bit allows the current location within the source data to be output to an output register as the current offset. A program can later read the current offset to find the location of a particular data item within the source data. This is especially useful for variable-length fields as explained later for FIG. 9.

When equal (E) bit 88 is set, a compare value is read from value field 92 for the current copy-rule. This compare value is compared to the current data item in the source data being verified. This allows for checking that the current data item within the data being copied is equal to an expected value.

When value (V) bit 89 is set, the value of the current data item is output to an output register. A program can later read the value of the data item within the source data, allowing further processing of the data item. Thus the value bit is useful for extracting a data value from a series of data items in source data being copied.

In one embodiment, only one of the R, M, E control bits in control byte 80 can be set for the same copy-rule. Other combinations are not allowed, such as having both the offset and value bits set, since both write to the output register, or having both equal and range bits set, because value field 92 can contain just one value—either the equal value or the range value. One of the R, M, and E bits and one of the O, V bits may be set in one copy-rule.

Figure 8:
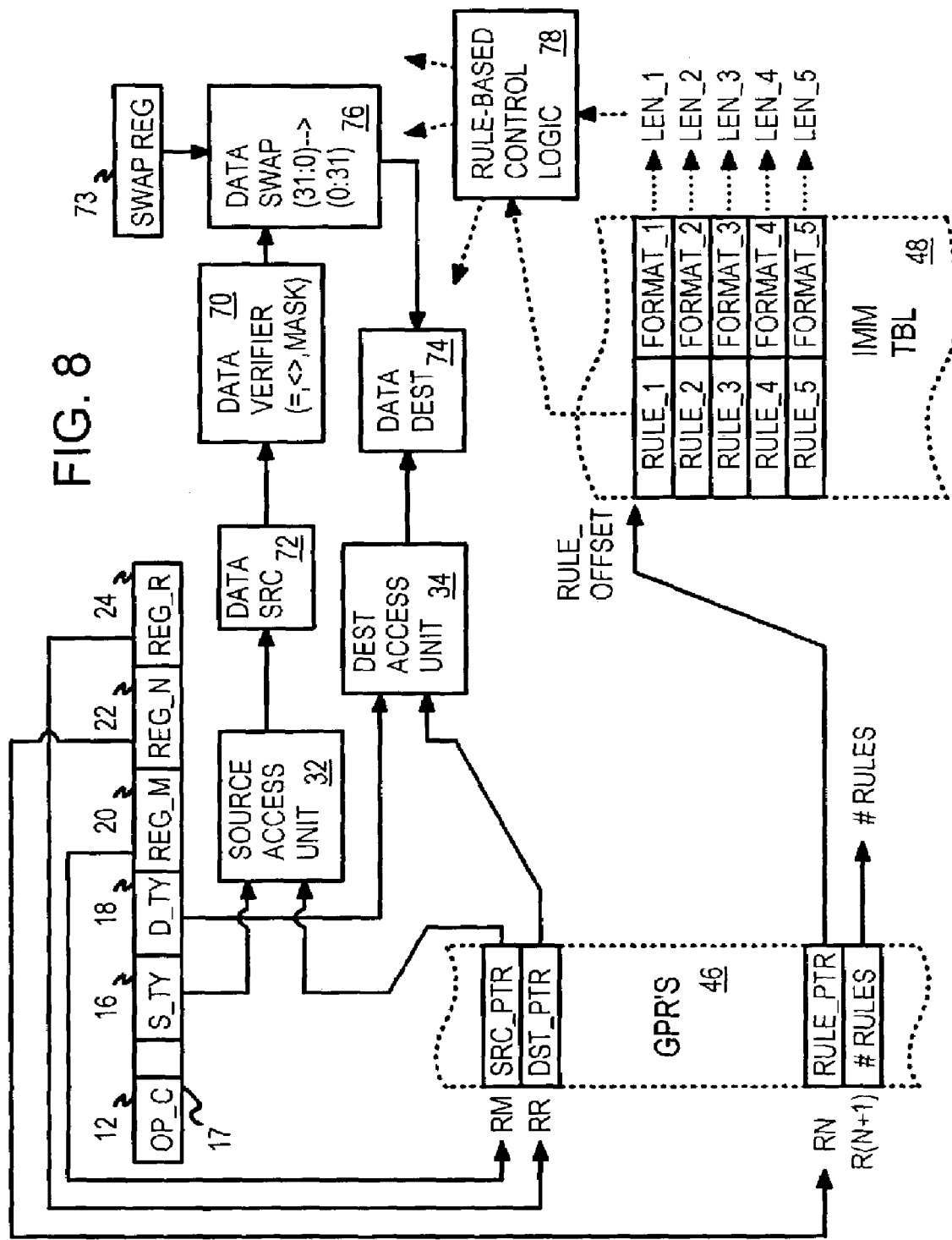
FIG. 8 highlights execution of a copy-with-validate instruction using copy-rules.

Copy-with-Validate Instruction Execution—FIG. 8

FIG. 8 highlights execution of a copy-with-validate instruction using copy-rules. Execution of the copy-with-validate instruction in instruction register 17 is similar to that described for FIG. 6. However, operand field 22 points to register N, which contains a rule pointer RULE_PTR which is an offset in immediate table 48 that contains the first copy-rule, RULE_1.

The copy-with-validate instruction always must complete before a next instruction can execute, so no fence bit is needed. Also, no immediate bit is used. The condition control bit in instruction register 17 is examined to determine whether to read a condition-code register that can halt the copy operation when not equal to zero.

Instruction decoder 26 reads opcode 12 from instruction register 17 and decodes the opcode. In this example, opcode 12 is 0xC1 (hex), which is the opcode for the copy-with-validate instruction. Instruction decoder 26 selects a sequence of control signals and cycles for control logic 28 that causes the processor execution pipeline to perform the copy operation.

The resource types are read from type fields 16, 18. The source type S_TY specifies source resource 72 as the source containing the data block to be copied. The destination type D_TY specifies destination resource 74 as the destination the data block is to be copied to. A data block is to be copied from source resource 72 to destination resource 74 by the copy-with-validate instruction.

Operand fields 20, 24 specify which GPR registers in fixed-length registers 46 are the M and R registers. Register M contains source pointer SRC_PTR to a location in source resource 72 where the data block to be copied is located. Register R contains destination pointer DST_PTR to a location in destination resource 74 where the data block is copied to as copied data.

The source type S_TY from field 16 and the source pointer SRC_PTR from fixed-length registers 46 are sent to source access unit 32. Source access unit 32 reads the source data from source resource 72 at the address specified by the source pointer SRC_PTR. The data copied is routed through crossbar switch 36 (not shown) and data verifier 70 to destination access unit 34.

Destination access unit 34 receives destination type D_TY from field 18 and the destination pointer DST_PTR from fixed-length registers 46. The copy data from data verifier 70 and crossbar switch 36 (not shown) is written to a location in destination resource 74 specified by the destination pointer.

Operand field 22 specifies register N, which contains the rule pointer RULE_PTR. The rule pointer is an offset within immediate table 48 that contains the first copy-rule RULE_1. The number of copy-rules is contained in the register that follows register N, or register R(N+1). In this example there are 5 copy-rules. Five data-items in the source data can be parsed and verified with the 5 copy-rules in immediate table 48.

Copy Length Indirectly Specified by Copy-Rules

Unlike the basic copy instruction, no copy-length is specified by the copy-with-validate instruction in instruction register 17. Instead, the length of the data being copied is generated for each data item using the copy-rule being applied to that data item. The sum of the lengths of the individual data-items is the overall copy length of the copy-with-validate instruction.

Copying of each data-item is controlled by a copy-rule in immediate table 48. Each copy-rule contains a data-format field. The data-format field indirectly indicates the length in bytes of the data item. For example, an integer format has 4 bytes, while a double-integer format has 8 bytes. A variable-length string often has its length as the first few bytes of the data-item, such as the first 4 bytes. Thus the length of each data-item can be determined by reading the data-format (for fixed-size formats), or by reading the data-format and then reading the first few bytes of the variable-length data-item, since the first few bytes contain the length of the data-item.

Rule-based control logic 78 reads the data-format field of the current rule in immediate table 48, and determines the length of the current data-item from the data-format. The length can be read from a format table, or decode logic can be used to decode the data-format field. This current length is the number of bytes to for data verifier 70 to process, and the number of additional bytes to copy from source resource 72 to destination resource 74. Rule-based control logic 78 then increments the current copy-rule and processes the next data-item using the next copy-rule, until the number of rules specified in register R(N+1) is reached.

Rule-based control logic 78 also reads the control bits and value field for each copy-rule, and controls operation of data verifier 70. Value comparison, masking, or range checking can be performed by data verifier 70. A data value can be extracted from the current data-item and stored in one register of fixed-length registers 46, or the current offset to the current data-item (the sum of the lengths from LEN_1 up to but not including the current copy-rule's length) calculated by rule-based control logic 78 can be written to one register of fixed-length registers 46.

Data Swap—Big Endian to Little Endian

Swap register 73 can be a pre-determined register in fixed-length registers 46, such as register R28. When swap register 73 contains all zero, swap unit 76 passes the data through without altering the data. However, when swap register 73 is non-zero, swap unit 76 re-arranges the order of the bits (swaps) each data item of the data being copied. Some protocols use "big endian" formats, where the most-significant-bit (MSB) is the first bit in the data item, while other protocols use "little endian" formats, where the most-significant-bit (MSB) is the last bit in the data item. Swap unit 76 allows for conversion between protocol formats. This is especially useful for 4-byte integer formats.

In another embodiment, swap register 73 contains a copy-swap bit and a verify-swap bit. When the copy-swap bit is set, swap unit 76 re-orders the data-item copied to the destination resource. Since swap unit 76 is after data verifier 70, the original, un-swapped data is verified, before the swap. When the verify-swap bit is set, a second swapper (not shown) in data verifier 70 swaps the data before verification. Thus verification is performed on swapped data when the verify-swap bit is set. When the verify-swap bit is set, but the copy-swap bit is not set, then swapped data is verified, but the copied data is not swapped. The copied data bypasses the second swapper in data verifier 70 in this situation.

Figure 9:
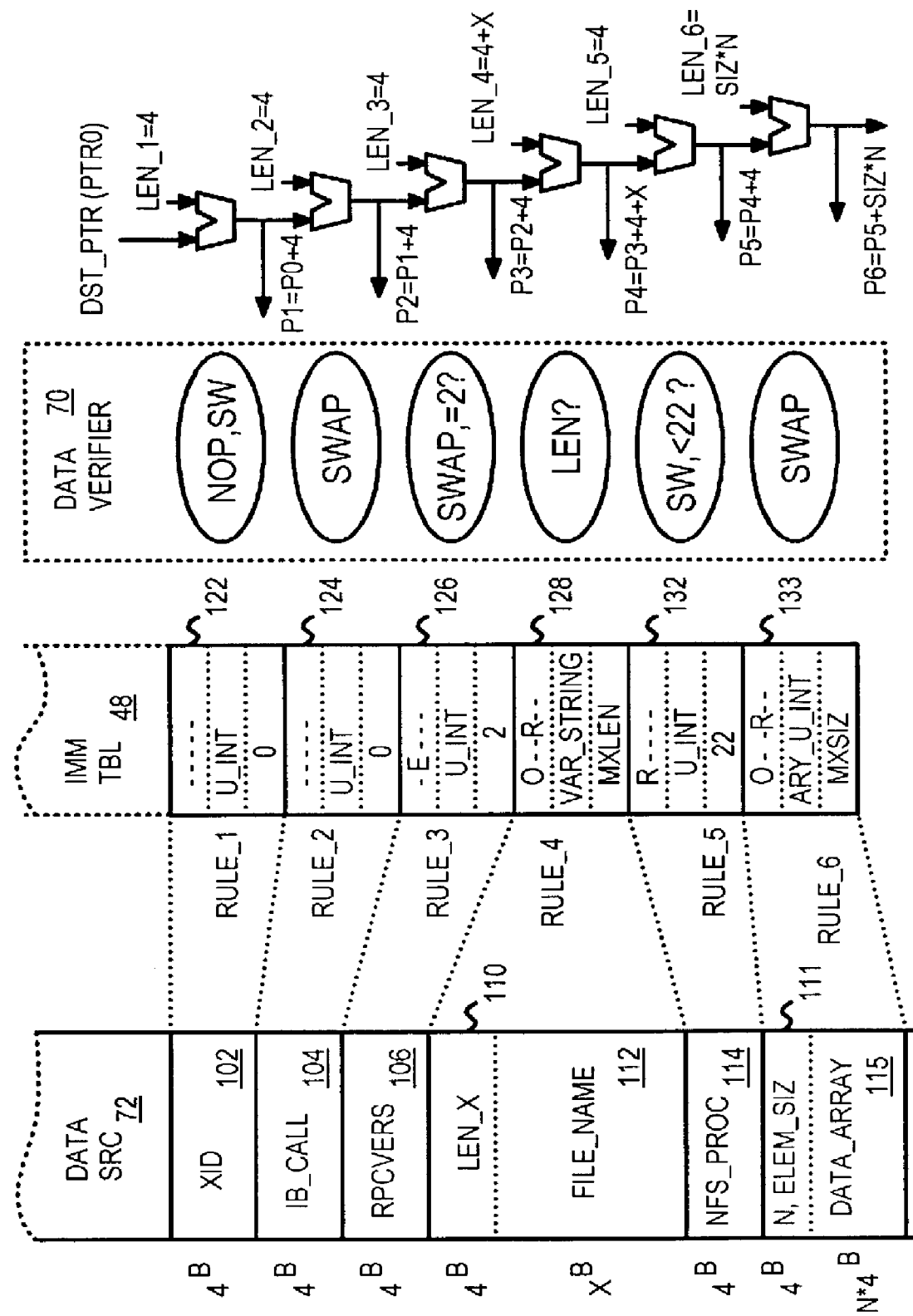
FIG. 9 highlights a series of copy-rules that control copy and validation of a series of data-items that are fields in a message header being copied.

FIG. 9 highlights a series of copy-rules that control copy and validation of a series of data-items that are fields in a message header being copied. Data is being copied from data source resource 72 to a destination. The data in data source resource 72 is a message being parsed. The message contains a number of fields 102–115. Each of fields 102–115 is a data-item validated using a different copy-rule 122–133 in immediate table 48. Validation of the data-items is performed by data verifier 70, which performs the validation operation(s) specified by the copy-rules. Offsets within the data being copied are also accumulated.

For example, a message has a header with five fields, beginning with XID field 102 in data source resource 72 that is validated using first copy-rule 122. The second header field, IB call field 104, is validated using second copy-rule 124. The third header field, RPC version field 106, is validated by third copy-rule 126. File-name field 112 is validated by fourth copy-rule 128, and NFS process field 114 is validated using fifth copy-rule 132. Data array field 115 is validated with sixth copy-rule 133. The number of rules in register R(N+1) is set to 6 to process the first six fields in the header stored in source resource 72.

The first field in data source resource 72 is XID field 102. XID field 102 contains an identifier for the message, such as a unique message number. First copy-rule 122 is pointed to by the rule pointer in register RN. First copy-rule 122 has no control bits set, but has a data-format of unsigned-integer (U_INT), and has no valid value in the valid field. No validation (NOP) is performed on XID field 102 by data verifier 70 except for data swapping since no control bits are set in copy-rule 122. However, the number of bytes to copy from source resource 72 is determined by reading the data-format field in first copy-rule 122. This format, U_INT, is a fixed format of four bytes, so four bytes are read and copied to the destination. The length of the first data-item, LEN_1, is 4, and can be added to the source pointer or the destination pointer or an offset pointer to get the current offset, pointer P1. Calculation of pointers in the destination resource are shown on the right of FIG. 9.

The second field in data source resource 72 is IB call field 104. Using the incremental current offset of 4 bytes, field 104 is read. IB call field 104 contains a call or reply message-type indicator. Second copy-rule 124 validates field 104. Again, no control bits are set and the value field is undefined since the value of the IB call field is not important to this particular parsing program. No validation is performed on IB call field 104 by data verifier 70 since no control bits are set in copy-rule 124. However, the swap register is set, so the data is swapped or re-ordered by data verifier 70 before being written to the destination resource.

The data-format of copy-rule 124 for field 104 is unsigned-integer (U_INT). This format, U_INT, is a fixed format of four bytes, so four bytes are read, swapped, and copied to the destination, starting from the last offset (4) to the new offset (8) in source resource 72. The length of the second data-item, LEN_2, is also 4, and can be added to the source, destination, or offset pointer to get the current pointer P2. For example, the current destination pointer to destination resource 74 is P2=P1+4.

The third field, RPC version field 106, contains a version number for the RPC protocol the message is using. Third copy-rule 126 validates this field. The equal (E) control bit is sent in copy-rule 126, and the value field is loaded with the value "2". Data verifier 70 compares this value (2) stored in copy-rule 126 to the data-item read from RPC version field 106. If version field 106 is not equal to 2, the copy-with-validate instruction fails and an error code (such as the failing copy-rule number) is written to the condition-code register. Further copy-rules are not processed since the instruction halts operation.

When the data-item in field 106 matches the expected value (=2), then data verifier 70 also swaps the data. Swapping could be performed before or after the comparison. The data-format in third copy-rule 126 is also U_INT, so four bytes are read from source resource 72, starting from the old pointer P2, offset (8), and ending with the new pointer P3, offset (8+4=12).

File-name field 112 contains a file name or a file handle. The file name varies in length. The first four bytes of file-name field 112 is length field 110, which contains the length (X bytes) of the data in field 112 excluding length field 110.

File-name field 112 is processed by fourth copy-rule 128, which has a variable-string data-format and the range control bit set. Length field 110 (LEN_X) is read from field 112 and compared to the maximum length MXLEN in the value field of copy-rule 128. If the length LEN_X read is greater than the maximum length MXLEN in the value field of copy-rule 128, then the copy-with-validate instruction fails and the failing copy-rule number (4) written to the condition register. Further processing then halts.

When length field 110 is within the maximum length MXLEN, 4+X bytes are copied from source resource 72 to the destination. The variable-length data itself is not swapped, since the format is variable length, but length field 110 is swapped.

The new pointer, P4, is the sum of the last pointer P3 and the length of field 112, which is 4+X including the four bytes of length field 110. The new destination offset is thus P4=P3+4+X, or 16+X bytes from the start of the data in first field 102. The file name with the length field from file-name field 112 is read from pointer P3, offset 12 to pointer P4, offset 16+X.

The next field NFS process field 114 is verified by fifth copy-rule 132. The format is U_INT, with a fixed length of 4 bytes, so 4 bytes are read from source resource 72. The range control bit in copy-rule 132 is set, so the value field contains a range value (22). Data verifier 70 compares the value of the 4 bytes read from field 132 to the range value (22). If field 114 contains a value greater than the range value 22, the instruction fails. Otherwise, the 4 bytes are copied to the destination, from pointer P4 (offset X+16). The new pointer, P5, is P4+4 bytes, which points to the byte after the last byte copied.

Data-array field 115 contains an array of data elements. The size of the array varies in length. The first four bytes of data-array field 115 is size field 111, which contains the size (SIZ bytes) of each data element, and the number of elements in the array, N. For example, the data array may be an array of 4-byte integers, where SIZ is 4 bytes per element and there are N elements.

Data-array field 115 is processed by sixth copy-rule 133, which has a variable-size data-array format and the range control bit set. Size field 111 is read from field 115 and compared to the maximum array size MXSIZ in the value field of copy-rule 133. If the size SIZ*N read is greater than the maximum size MXSIZ in the value field of copy-rule 133, then the copy-with-validate instruction fails and the failing copy-rule number (6) written to the condition register. Further processing then halts.

When size field 111 is within the maximum size MXSIZ, N elements of SIZ bytes each are copied from source resource 72 to the destination. Each element is swapped, and the size SIZ and number of elements N in size field 111 are swapped.

The new pointer, P6, is the sum of the last pointer P5 and the length of field 115, which is 4+SIZ*N including the four bytes of size field 111. The new pointer is thus P6=P5+4+ SIZ*N, or 16+X+SIZ*N bytes from the start of the data in first field 102.

If the O control bit was also set in the copy-rule, the offset to the start of the final field, X+16, would be written to register R(R+1). If instead the V control bit were set, the value of the data-item in the field would be written to register R(R+1). Once register R(R+1) were written by a prior copy-rule, register R(R+2) would be written, and then register R(R+3) and R(R+4).

Since the offsets can be written out to a register by setting the O bit of a copy-rule, the programmer or program code can read the offsets, even when variable-length fields are copied. The program does not have to know the length of the header fields during validation. Offsets for the destination are shown, but source or other offsets could be output. The programmer does not have to know the total length of the data being copied, since the programmer can read pointers to data-items within the data being copied.

Figure 10:
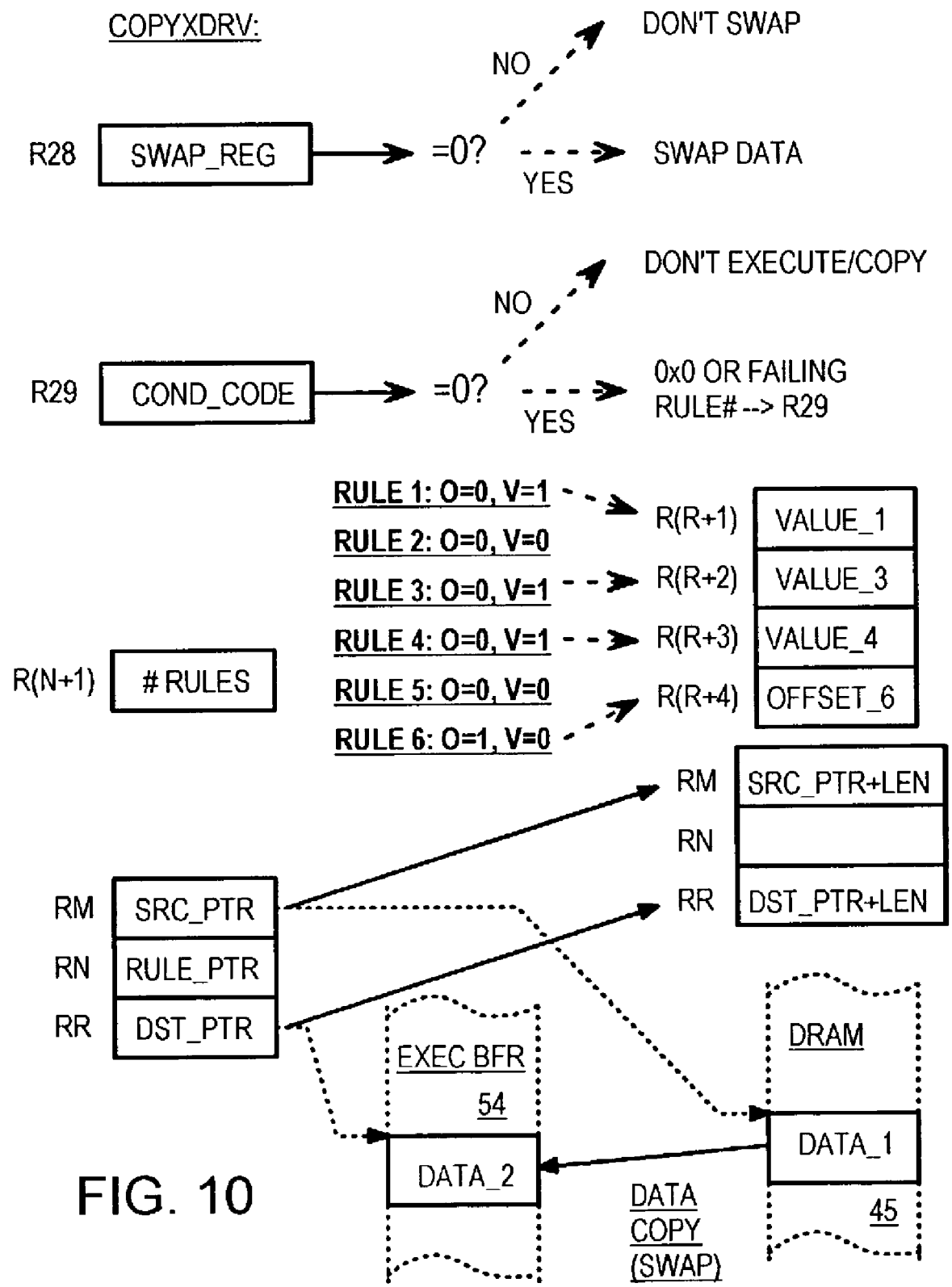
FIG. 10 shows register usage for a copy-with-validate instruction when the offset control bit is set in a copy-rule.

FIG. 10 shows register usage for a copy-with-validate instruction when the offset control bit is set in a copy-rule. The swap register determines whether to re-order or swap data during a copy. A non-zero value in the swap register prevents swapping. In this embodiment, register R29 is used as the swap register.

The condition-code register determines whether to prevent execution of a copy. Previous instructions can set the condition-code register. Thus previous results can prevent execution of the copy instruction. A non-zero value in the condition-code register prevents execution. In this embodiment, register R28 is used as the condition-code register. A condition code can be written to the condition-code register during execution of the current copy-with-validate instruction. For example, the copy-rule number of a copy-rule that causes a failure can be written to the condition-code register. Some other error code could also be written on a failure.

Register R(N+1) contains the number of rules to process. This is also the number of fields or data-items in the source data. Operand register RM contains the source pointer SRC_PTR, while operand register RN contains the rule pointer to the first rule in the immediate table. Operand register RM contains the destination pointer DST_PTR. Data is copied from the source resource (DRAM 45 in this example), to the destination resource (execution buffers 54). When the swap register is non-zero, the data is swapped so that copied data DATA_2 is in a reverse ordering from source data DATA_1. For example, each byte can be re-ordered, or each word of 4 bytes can be re-ordered, or each entire field can be re-ordered.

The source pointer points to the first byte to read from the source resource, while the destination pointer points to the first location to write the copied data to in the destination resource. Offsets can be generated from these initial locations for individual data items in the data being copied.

Upon completion of execution of the copy-with-validate instruction, the source and destination pointers are updated to point to the byte following the last byte copied. The source pointer in register RM, SRC_PTR, is increased to SRC_PTR+LEN, where LEN is the accumulated length of all the data-items validated or copied. The destination pointer in register RR, DST_PTR, is likewise adjusted to DST_PTR+LEN. For the example of FIG. 9, where LEN is the final offset, or 20+X. Thus the destination pointer that was DO before execution is adjusted to DO+20+X after execution. When a validation failure occurred, the pointers are advanced by the length of bytes copied before the failure occurred.

When the offset (O) control bit is set for a copy-rule, the current offset is stored in the next available output register in the range of R(R+1) to R(R+4). This allows the program to read the offset of an intermediate data-item in the data block, such as the offset of a header field that follows a variable-length file name. The program can use the stored offset to more easily extract the desired data, such as the following header field or the file name.

When the value (V) control bit is set for a copy-rule, the value of the current data-item validated by that rule is stored in the next available output register in the range of R(R+1) to R(R+4). This allows the program to directly read the value of an intermediate data-item in the data block, such as a command value in a header field that follows a variable-length file name. The program can use the stored command value to process the message by executing a routine for the stored command.

In the example of FIG. 10, six rules are validated. Rule 1 has its V bit set, so the value of the first data-item is written to the first available output register, R(R+1). Rule 2 has neither the V nor O bit set, so rule 2 does not write to any output register. Rule 3 also has its V bit set, so the value of the third data-item is written to the next available output register, R(R+2). Rule 4 also has its V bit set, so the value of the fourth data-item is written to the next available output register, R(R+3). Rule 5 has neither the V nor O bit set, so rule 5 does not write to any output register. Rule 6 has its O bit set, so the offset for the sixth data-item is written to the next available output register, R(R+4).

Alternate Embodiments

Several other embodiments are contemplated by the inventors. Different field widths and data widths can be substituted. For example, smaller or larger opcode, control-bit, resource-type, and operand fields can be specified. Various instruction-ordering and conflict handling schemes can be implement in hardware, software, firmware, or some combination. The sizes of the various resources are just examples. Other sizes for the registers, input, output, execution buffers, and memories can be substituted. Copy-rules could be repeated for several fields by having a repeat parameter in the rule. The size of variable-length fields may be padded to align fields to 4-byte or other boundaries. The additional padding bytes may or may not be included in the variable-field length X. When pad bytes are not included in length X, then the processor can advance the pointers to account for the additional pad bytes.

Copy/move unit 58 can be implemented in a variety of ways and configurations. The crossbar switch can be intelligent or dumb, using muxes or bus connections or more sophisticated switching nodes. Parallel components can be added to increase bandwidth and reduce latency due to contention for copy or access resources. Data can be forwarded through nodes in the crossbar switch, or a direct connection between endpoints can be made. The data can be divided into multiple blocks that are separately routed through crossbar switch 36, or the data can be transferred all at once. Various bandwidth-reservation, priority, or arbitration schemes could be employed for use of the crossbar switch or for access to the resources. Fixed, weighted, or other arbitration schemes could be used for different resources. Data swapping can be performed either before and/or after the data verifier. Offsets stored in the register could be the offset to the current data item of the offset to the next data-item.

Source and destination access units can be dedicated to a particular resource, or can be shared among a subset of the resources, or can access any of the resources. Various combinations can be used as well, allowing for optimization of access hardware. Copies could be performed within the same resource, such as from one address to another in the DRAM or global block. The immediate table could be read-only or could be part of one of the resources, such as the global block or SRAM.

Copying of data has been described as incremental, wherein each data-item is copied separately. However, bytes being copies can be accumulated and then written to the destination resource all at one to reduce memory accesses. Bytes from several or all data-items could be accumulated after the data verifier or after the swap unit, or at some other point. Likewise, a block of data could be read speculatively from the source resource to a temporary buffer, and then bytes from each data-item read from the temporary buffer and processed, reducing the number of accesses required of the source resource. Rules and validation may be nested. One of the rules in the primary rule list pointed to by the instruction could be a pointer to a secondary rule list that contains a sequence of additional rules to validate. Control could return to the original rule list after completion of the secondary rule list.

Masking could be performed to extract a portion of a data-item for comparison. Another control bit could determine whether the entire data-item or just a portion is compared. For example, the first four bytes containing a length could be compared to a maximum length, while the entire data-item could be compared to an expected value for other rules. Some embodiments may allow more than one control bit to be set in a copy-rule. When both mask (M) bit 84 and range (R) bit 82 are set, a portion of the data-item can be compared, rather than the whole data-item. For example, a variable-length data-item can have a length parameter as the first four bytes, followed by the variable-length data itself. The mask can be set to pass only the first four bytes. Then the first four bytes are compared to a range value that is stored in value field 92 of the current rule. Since the first four bytes are the length parameter, the source length is compared to the range value.

The processor may alter the validation operation depending on the format of the data-item. For example, only the first 4-bytes of variable-length strings may be operated upon or swapped. Swapping may be disabled for variable-length or longer fixed-length formats. More complex operations may be performed that include modulo rounding. Swapping may be performed only on integer formats and not on string or Boolean formats. The swap register may include some of the control bits in the copy-rule, such as global default validation operations performed on all data-items. A global range bit, or a select bit that selects from among the R, E, M operations could be added to the swap register or to another register.

The condition-code register can be a fixed one of the fixed-length registers, such as register R29, or can be a dedicated condition-code register, or can be one of the fixed-length registers that is pointed to by a code in the instruction or in a register. Likewise the swap register can be a fixed register, such as R28, or a dedicated register or dedicated control bit or flag in a register, or a register pointed to by another register or by a field in the instruction. Other variations are possible, such as having bits in a larger data structure perform the swap and condition functions.

The operands may be somewhat different for different instruction flavors. For example, the length is an operand in the basic copy but not in the copy-with-validate instruction, but other variations are possible. One operand register and a series of following registers can hold a sequence or list of operands.

Offsets can be from the beginning of the data block or from the beginning of the resource, or from the beginning of a section of the resource, or from some other reference location. Other offsets or absolute addresses could be substituted. Offsets could be byte-offsets, bit-offsets, word-offsets, or some other size.

Pointers could be to the end of the block, rather than to the beginning. Offsets could point to the location immediately following the end of the data item, or some other coding could be used to allow the end of the data-item to be found. Various codes could be employed rather than a binary number indicating the number of bits or bytes. Length can be specified in various ways including an end pointer. Controls bits can be activated or "set" either high or low. The copy instruction could perform a move by invalidating the source data after the copy operation.

SRAM or fast DRAM could be used for the global block or other resources, while slower DRAM, solid-state, or disk storage could also be used. The execution buffer could be within the processor core, or could reside in memory, or could reside partially in memory and partially in the core.

Figure 11:
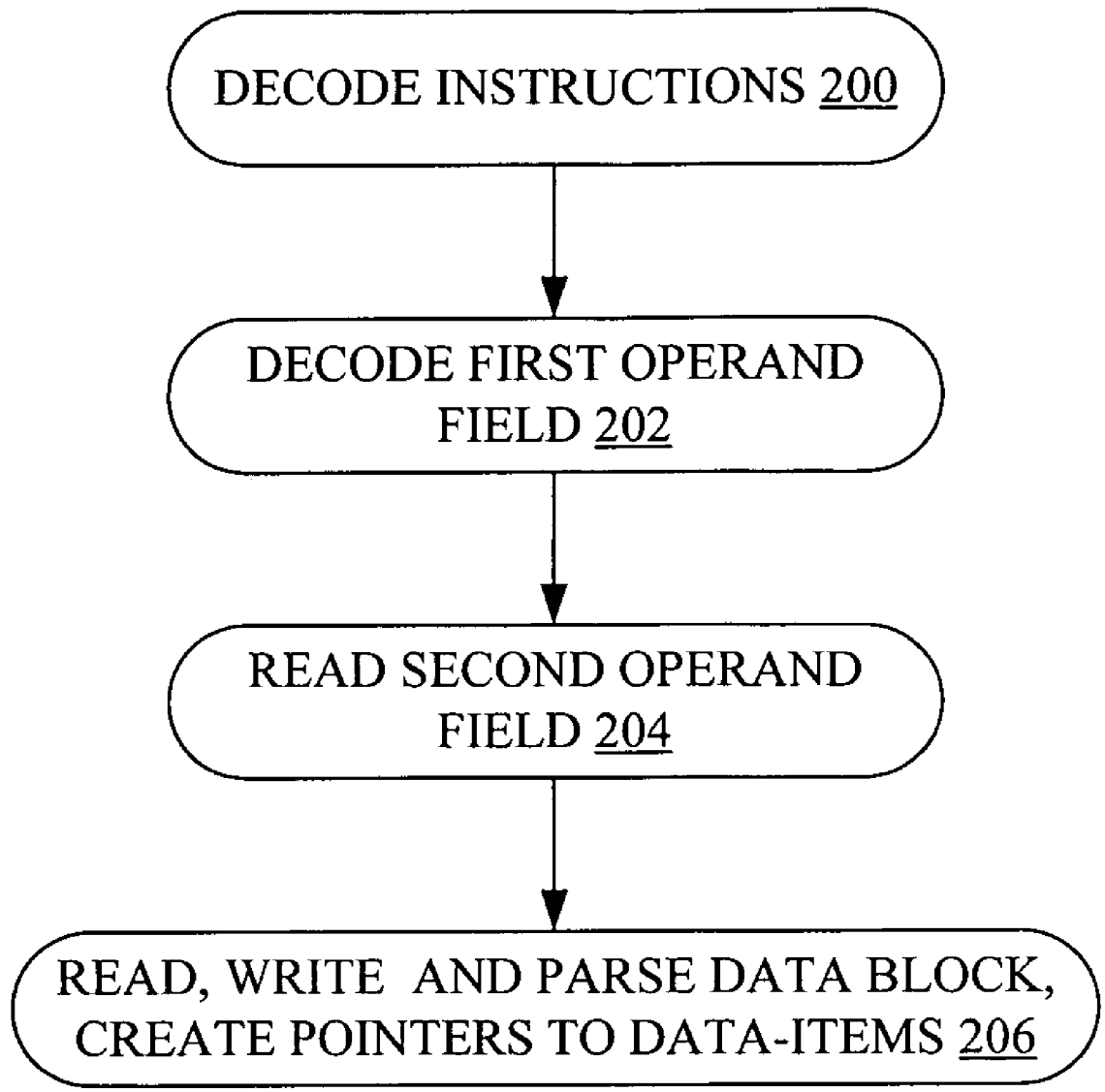
FIG. 11 shows a computerized method for executing a copy instruction.

FIG. 11 shows a computerized method for executing a copy instruction comprising: decoding instructions 200 for execution by a processor including decoding the copy instruction that contains an opcode that specifies a copy operation between any two of a plurality of resources that include a register file of registers, a dynamic-random-access memory (DRAM), and buffer memories; decoding a first operand field 202 in the copy instruction and a result field in the copy instruction, the first operand field specifying a first register in the register file that contains a source pointer to a data block in a source resource in the plurality of resources, and the result field specifying a result register in the register file that contains a destination pointer to a location to write a copy of the data block to in a destination resource in the plurality of resources; reading a second operand field 204 in the copy instruction, the second operand field specifying a second register in the register file that contains a copy-length; and reading the data block from the source resource and writing the data block to the destination resource, the data block having a length specified by the copy-length, such that the copy instruction is decoded and executed to copy the data block having a variable length among the plurality of resources, including parsing the data block to create a series of pointers that correspond to a series of data-items within the data block 206.

Execution may be pipelined, where several instructions are in various stages of completion at any instant in time. Complex data forwarding and locking controls can be added to ensure consistency, and pipestage registers and controls can be added. Adders can be part of a larger unit-logic-unit (ALU) or a separate address-generation unit. A shared adder may be used several times for generating different portions of addresses rather than having separate adders. The control logic that controls computation and execution logic can be hardwired or programmable such as by firmware, or may be a state-machine, sequencer, or micro-code.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A processor comprising:
an instruction decoder for decoding instructions in a program being executed by the processor, the instructions including a copy instruction;
a plurality of memory resources for storing data, including a register file containing registers that store operands operated upon by the instructions, the registers being identified by operand fields in the instructions decoded by the instruction decoder;
a copy unit, activated by the instruction decoder when the copy instruction is decoded, for performing a copy operation indicated by the copy instruction, the copy operation reading a data block from a source resource in the plurality of memory resources, the source resource specified by the copy instruction, the copy operation writing the data block to a destination resource in the plurality of memory resources, the destination resource specified by the copy instruction, the copy operation parsing the data block to create a series of pointers that correspond to a series of data-items within the data block, wherein at least one of the data-items includes a file name or file handle.

2. The processor of claim 1 wherein the copy instruction comprises:
an opcode field indicating the copy operation;
a source type field that indicates which of the plurality of memory resources is the source resource;
a source operand field, specifying a source register in the register file, the source register containing a source pointer;
a destination type field that indicates which of the plurality of memory resources is the destination resource;
and a destination operand field, specifying a destination register in the register file, the destination register containing a destination pointer;
wherein the copy unit copies the data block from the source resource specified by the source type field from a location within the source resource specified by the source pointer; the copy unit copying the data block to the destination resource specified by the destination type field to a location within the destination resource specified by the destination pointer.

3. The processor of claim 1 wherein the plurality of memory resources further comprises:
an execution buffer, for storing variable-length operands, wherein operands in the register file include pointer operands that indicate locations of the variable-length operands in the execution buffer;
wherein the register file contains a plurality of fixed-size registers that can each store an operand, a pointer operand, or a result of instruction execution.

4. The processor of claim 1 wherein the copy instruction further comprises:
a length operand field specifying a length register in the register file, the length register containing a copy-length;
wherein the copy unit copies the data block for a length specified by the copy-length from the length register.

5. The processor of claim 4 wherein the copy instruction further comprises:
an immediate control bit;
wherein when the immediate control bit is set, the length operand field specifies an offset into an immediate table, the offset specifying a location of the copy-length stored in the immediate table;
wherein the copy unit copies the data block for the length specified by the copy-length from the immediate table when the immediate control bit is set.

6. The processor of claim 1 wherein the copy instruction is a copy-with-validate instruction;
wherein a plurality of copy-rules is accessed by the copy unit;
wherein each copy-rule in the plurality of copy-rules controls validation of a corresponding one of the data-items in the series of data-items;
wherein the copy unit further comprises:
a data verifier, responsive to the copy-rules, for verifying the data block being copied by reading a current copy-rule, the current copy-rule corresponding to a current data-item in the series of data-items, the data verifier performing a validation operation on the current data-item, the validation operation specified by the current copy-rule.

7. The processor of claim 6 wherein the register file further comprises a rule-number register that contains a specified number of the plurality of copy-rules to process;
wherein the data verifier processes the specified number of data-items using the specified number of copy-rules by advancing the current data-item to a next data-item and advancing the current copy-rule to a next copy-rule after each data-item is validated.

8. The processor of claim 6 wherein the copy instruction is a copy-with-validate instruction that further comprises:
a copy-rule operand field specifying an offset into an immediate table, the offset specifying a location of the plurality of copy-rules stored in the immediate table, whereby the copy-rules are stored in the immediate table.

9. The processor of claim 7 wherein each copy-rule comprises:
control bits that indicate a validation operation to perform on the current data-item;
a value field for storing a compare value to compare to the data-item when the control bits indicate a compare operation;
a format field that indicates a format of the data-item.

10. The processor of claim 9 wherein a current length of the current data-item is determined by the format field in the current copy-rule when the format field specifies a fixed-length format, but the current length is read from the data-item when the format field specified a variable-length format;
wherein an overall length of the data block is a sum of current lengths of all data-items in the data block, whereby overall copy length is summed from current lengths of data-items, the current lengths determined by formats of the data-items.

11. The processor of claim 10 wherein the validation operation specified by the control bits is:
a compare operation that writes a failure code to a condition-code register in the register file when the data-item does not equal the value field;
a range operation that writes a failure code to the condition-code register in the register file when the data-item exceeds the value field;
a value-output operation that writes a value of the data-item to an output register in the register file; or
an offset-output operation that writes a current offset of the data-item to the output register in the register file, the current offset being a sum of current lengths of data-items before the current data-item.

12. A functional-level instruction-set computing (FLIC) processor comprising:
   decode means for decoding instructions including decoding a copy instruction that contains an opcode that specifies a copy operation;
   a plurality of storage units that comprise a register file containing registers accessible by execution of instructions decoded by the decode means, a memory, and a plurality of buffers;
   operand decode means for decoding a source operand field in the copy instruction and a destination operand field in the copy instruction, the source operand field specifying a first register in the register file that contains a source pointer to a source location of a data block in a source storage unit in the plurality of storage units, the destination operand field specifying a second register in the register file that contains a destination pointer to a destination location in a destination storage unit in the plurality of storage units;
   copy means, responsive to the decode means when the copy instruction is decoded, for copying the data block from the source location in the source storage unit to the destination location in the destination storage unit;
   wherein the data block comprises a series of data-items including a file name or file handle, and the copy means generates a series of pointers corresponding to the series of data-items, including a pointer to the file name or file handle;
   rule means for storing a plurality of copy-rules, each successive copy-rule for specifying a validation operation to perform on a successive data-item of the data block; and
   validate means, responsive to the decode means when the copy instruction is decoded and the copy instruction is a copy-with-validate instruction, for successively validating the series of data-items in the data block, the validate means successively reading the plurality of copy-rules to determine successive validation operations to perform on the series of data-items, whereby the copy instruction is decoded and executed to copy the data block.

13. The FLIC processor of claim 12 further comprising:
   wherein each data-item has an item-length;
   wherein item-lengths differ for data-items of differing lengths and data formats in the series of data-items in the data block;
   further comprising:
   successive offset means, coupled to the validate means, for accumulating item-lengths of the data-items that have already been validated by the validate means to generate a current offset, the current offset being a location within the data block of a current data-item; and
   offset output means for outputting the current offset to an output register in the register file when the validation operation specified by a copy-rule is an offset-output validation operation, whereby current offsets within the data block are output using the offset-output validation operation.

14. The FLIC processor of claim 12 further comprising:
   swap means for re-arranging positions of bits in the data-items to reverse a bit-ordering of the data-items;
   first swap indicator means for activating the swap means to swap data-items before input to the copy means;
   second swap indicator means for activating the swap means to swap data-items before input to the validate means, whereby data-items are swapped before the validate means or before the copy means.

15. A computerized method for executing a copy instruction comprising:
   decoding instructions for execution by a processor including decoding the copy instruction that contains an opcode that specifies a copy operation between any two of a plurality of resources that include a register file of registers, a dynamic-random-access memory (DRAM), and buffer memories;
   decoding a first operand field in the copy instruction and a result field in the copy instruction, the first operand field specifying a first register in the register file that contains a source pointer to a data block in a source resource in the plurality of resources, and the result field specifying a result register in the register file that contains a destination pointer to a location to write a copy of the data block to in a destination resource in the plurality of resources;
   reading a second operand field in the copy instruction, the second operand field specifying a second register in the register file that contains a copy-length; and
   reading the data block from the source resource and writing the data block to the destination resource, the data block having a length specified by the copy-length, such that the copy instruction is decoded and executed to copy the data block having a variable length among the plurality of resources, including parsing the data block to create a series of pointers that correspond to a series of data-items within the data block.

16. The computerized method of claim 15 wherein when an immediate bit is set in the copy instruction:
   reading the second operand field in the copy instruction, the second operand field containing a pointer to the copy-length in an immediate table that contains immediate constants referred to by instructions; and
   reading the data block from the source resource and writing the data block to the destination resource, the data block having a length specified by the copy-length, whereby the copy-length is read from the immediate table when the immediate bit is set in the copy instruction.

17. The computerized method of claim 15 further comprising:
   when the copy instruction is a copy-with-validate instruction:
   reading the second operand field in the copy instruction, the second operand field specifying a second register in the register file that contains a rule pointer to a rule table in an immediate table that contains immediate constants referred to by instructions;
   validating a plurality of sub-blocks within the data block, each subsequent sub-block being validated by a subsequent rule in the rule table; and
   reading the data block from the source resource and writing the data block to the destination resource, the data block having a length determined by rules in the rule table, each rule indicating a sub-length of a sub-block within the data block, whereby sub-blocks are validated by a plurality of rules in the rule table pointed to by the second operand field of the copy-with-validate instruction, the rules determining the copy-length.

18. The computerized method of claim 17 wherein validating a current sub-block comprises:
   reading a format field in a current rule in the rule table, the format field specifying a current format of the current sub-block;

determining a current length of the current sub-block, the current length being determined by the current format for fixed-length formats, but the current length being read from a length indicator within the current sub-block when the current format is for a variable-length format;

reading a portion of the data block in the source resource for a length equal to the current length to read a current value of the current sub-block;

reading control bits in the current rule;

reading a compare value field in the current rule;

comparing the current value read from the source resource to the compare value field in the current rule when the control bits indicate a compare operation; and writing an indicator of the current rule to a condition-code register when the compare operation fails, whereby sub-blocks are validated using rules in the rule table.

19. The computerized method of claim 18 wherein validating the current sub-block further comprises:

writing the current value from the source resource to an output register when a value control bit in the control bits is set;

generating a current offset by summing prior current lengths of prior sub-blocks in the data block before the current sub-block; and writing the current offset to the output register when an offset control bit in the control bits is set, whereby current offsets or current values of intermediate sub-blocks are output to registers in response to control bits in the rules.

20. The computerized method of claim 17 further comprising:

reversing bit-ordering of data in the current sub-block when a swap indicator is set, whereby bit-ordering of data is reversed when the swap indicator is set.

21. The computerized method of claim 20 further comprising:

reading a number of rules from a rule-count register in the register file;

processing a number of sub-blocks determined by the number of rules from the rule-count register.

* * * * *